July 1, 1958 T. C. HALL 2,841,477

PHOTOCHEMICALLY ACTIVATED GASEOUS ETCHING METHOD

Filed March 4, 1956

THOMAS C. HALL,
INVENTOR.

BY Spensley and Horn

ATTORNEYS.

United States Patent Office 2,841,477

Patented July 1, 1958

2,841,477

PHOTOCHEMICALLY ACTIVATED GASEOUS ETCHING METHOD

Thomas C. Hall, Playa Del Rey, Calif., assignor to Pacific Semiconductors, Inc., Culver City, Calif., a corporation of Delaware Application March 4, 1957, Serial No. 643,668

9 Claims. (Cl. 41—42)

This invention relates to etching of metals and the like and more particularly to a method of etching semiconductor materials by use of photochemically activated gases.

This invention will be described with respect to the semiconductor art, but such is by way of illustration only, the method of the present invention being equally applicable to other metal working arts.

In the semiconductor art, during the processing of the body or crystal of semiconductor material which is to be manufactured into a device such as a diode or a transistor, many imperfections are introduced into the crystal at the surface thereof. Further, surface damage results during the necessary sawing, grinding and polishing operations, and the like.

In the fabrication of semiconductor devices it is often necessary to introduce a high order of control in the etching process.

The term etching as used herein is intended to include surface cleaning of semiconductor materials to remove areas of damaged crystal surface. It is also intended to include any non-mechanical cutting or shaping of the crystal or device being fabricated.

The present art method of etching semiconductor devices involves the immersion of the body to be etched in a mixture of chemically reactive liquids such as a mixture of 50 percent hydrofluoric acid and 50 percent nitric acid or a mixture of 33⅓ hydrofluoric acid, 33⅓ nitric acid and 33⅓ acetic acid or a solution of potassium hydroxide in which by complex chemical action damaged semiconductor material, for example, is removed from the crystal. This prior art method makes control of the etching process with respect both to locus and time duration of the etching action extremely difficult and in some particular areas impossible.

Another difficulty attendant with the prior art etching methods is that the nature of the resultant semiconductor surface subsequent to etching is complex in structure and not readily understandable in function.

The present invention overcomes the above and other difficulties and disadvantages encountered in the prior art etching techniques.

According to the basic concept of the present invention ultra-violet radiation is used to activate an otherwise inactive photolyzable gas or gases which gas produces species of free radicals which are capable of reacting with the semiconductor crystal specimen in the gas.

It is therefore an object of the present invention to provide an improved method of etching metals and the like.

Another object of the present invention is to provide an improved method of etching semiconductor crystals which method possesses an inherently higher order of control.

Yet another object of the present invention is to provide an improved method for etching semiconductor surfaces to very close tolerances.

A further object of the present invention is to provide an improved method of etching semiconductor surfaces which permits close control over the time required to etch a given surface.

A yet further object of the present invention is to provide a method of etching semiconductor crystal surfaces which results in surfaces more chemically simple in structure than heretofore achieved.

The novel features which are believed to be characteristic of the invention both as to its organization and method of operation, together with further objects and advantages thereof will be better understood from the following description considered in connection with the accompanying drawing in which several embodiments of the method of the present invention are illustrated by way of example. It is to be expressly understood, however, that the drawing is for the purpose of illustration and example only, and is not intended as a definition of the limits of the invention.

Figure 1:
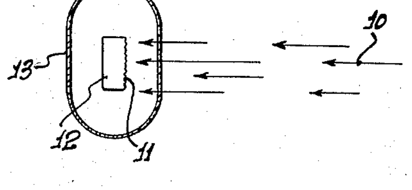
Figure 1 is an elevational view of one arrangement of apparatus used to practice the method of the present invention.

Referring now to the drawing, there is shown in Figure 1 a source of electro-magnetic radiation or ultra-violet light, i. e. radiation whose wave length is below 3000 A. represented by arrows 10 being directed at surface 11 of semiconductor crystal 12 which is contained within gas filled container 13. Container 13 may be of quartz, sapphire or any other suitable envelope which can be made gas tight and which is transparent to ultra-violet light.

In the embodiment associated with the Figure 1 apparatus the gas contained within envelope 13 is designated as gas G for convenience and may be carbon tetrachloride, methyl chloride or any other "photolyzable gas." What is meant by photolyzable gas herein, is any gas which will absorb ultra-violet radiation and be capable of being disassociated or activated thereby to form chemically active species according to the law of Grotthuss-Draper. The following listed gases in addition to the two gases above enumerated are equally applicable: ethylene chloride, ethylene bromide, ethylene iodide and ethylene fluoride. Should the latter gas be used, a higher energy light source would be necessary, i. e. one whose wave length is below 1500 A. such as a xenon lamp.

Basically, the principle of operation may be explained as follows. Semiconductor crystal 12 is placed within container 13, being held in place, by apparatus not shown. Thereafter one of the G gases enumerated above, such as carbon tetrachloride, is introduced into container 13 which is then sealed off.

Herein, it is assumed that the entire surface 11 of crystal 12 is desired to be etched. Accordingly, ultra-violet light source 10 is directed at the surface 11 of crystal 12. The gas which fills container 13, namely carbon tetrachloride, is ordinarily dormant or inactive unless exposed to ultra-violet light, therefore no reaction will take place between crystal 12 and the gas until ultra-violet light is directed upon the area of the crystal which is desired to be etched. When the beam of ultra-violet light represented by arrows 10 impinges upon surface 11 of crystal 12, the gas molecules in the immediate vicinity of surface 11 absorb the ultra-violet radiation and the gas disassociates under the influence of such light to form a chemically active species, namely chlorine atoms and trichloromethyl radicals which in turn react with surface 11 of crystal 12. It will be appreciated that inasmuch as the gas is inactive when not exposed to ultra-violet light, light source 10 merely has to be removed to halt the etching process.

As an alternative method for producing the etching reactions by photolyzable gas, the following method may be employed: Instead of introducing a single G gas such as has been above referred to which will directly absorb ultra-violet radiation and disassociate under the influence thereof to form chemically active species, two gases designated A and B are introduced into container 13.

Gas A may be defined as a non-ultra-violet light absorbing gas which is capable of disassociation into chemically active species by reacting with a B gas in a manner hereinafter to be described. Examples of gases which meet these requirements, i. e. A gases, are hydrogen, oxygen, nitrogen, methane, ethane or propane.

The B gas, on the other hand, may be defined as a gas which will absorb ultra-violet light, but which does not become activated (disassociated) thereby. The B gas, while not activated by ultra-violet light must, however, be capable of being excited thereby. Examples of gases which meet these requirements are iodine vapor, mercury vapor and xenon.

In the method of the present invention employing gases A and B, the same apparatus may be used as in the method employing a G gas. The reaction which takes place where ultra-violet light is directed at a container containing an A and B gas may be described as follows: The B gas absorbs radiation, but is not chemically altered thereby, it merely serves as a sensitizer for the A gas. The gas-ultra-violet light reaction may be symbolically represented by the following equation:

$$B + h\gamma \rightarrow B^*$$

wherein:

$h$ is Planck's constant
$\gamma$ is measure of frequency of light
* indicates photoactivated molecules The photoactivated B gas, $B^*$ will react with the A gas in a manner represented by the following equation:

$$B^* + A \rightarrow A^* + B$$

The activated gas (*) may itself now disassociate to form another gas or gases which in turn will react with surface 11 of crystal 12.

Figure 2:
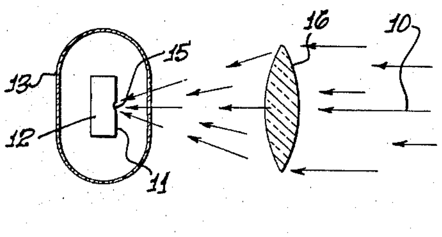
Figure 2 shows a modification in the apparatus of Figure 1.

Referring again to the drawing, there is shown in Figure 2 ultra-violet light source 10 directed at a small and predetermined portion of surface 11 of crystal 12 to produce a pit or hole 15 therein. This is accomplished by focussing the ultra-violet light by means of convex lens 16. Again as with the Figure 1 apparatus, either a G gas or the combination of an A and B gas may be used.

Figure 3:
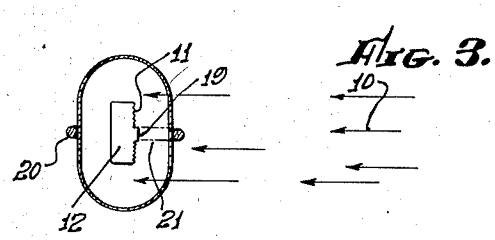
Figure 3 shows a second modification in the apparatus of Figure 1.

In Figure 3 there is shown an illustrative example of apparatus which may be employed to etch surface 11 in such a way as to leave a central raised portion 19 on crystal 12. A ring shield 20 which may be of wire or any other material which is opaque to ultra-violet light is disposed about container 13 in a position whereby surface 11 of crystal 12 will be shielded from the ultra-violet light so that no etching will take place within the area of shadow 21. It will, of course, be appreciated that this ring technique may be carried out by using various shaped templates surrounding or partially surrounding container 13 or by a plurality of the like.

Figure 4:
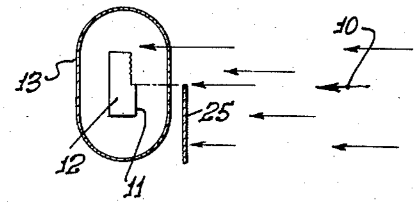
Figure 4 shows a third modification in the apparatus of Figure 1.

In Figure 4 a simple shield 25 which is opaque to ultra-violet light is placed as shown, intermediate the light source 10 and crystal 12 to produce a shadow over a portion of one end of surface 11 of crystal 12, thus a step may be etched in crystal 12 by the hereinabove described action of gas G or A and B under the influence of ultra-violet light.

Figure 5:
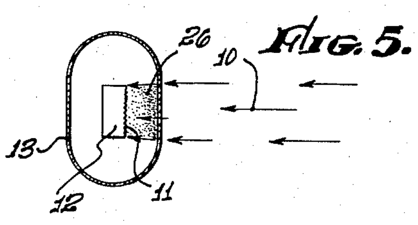
Figure 5 shows the apparatus of Figure 1 used to show the effect of gas pressure in the method of the present invention.

The effect of varying the gas pressure in container 13 of any of the apparatus discussed above is illustrated in Figure 5. As the pressure is increased the absorption of the gas G or the sensitizing gas B increases exponentially. Also the higher the pressure the shallower will be the light penetration. In Figure 5 the light front 26 is shown to be decreasing in intensity as it approaches surface 11 of crystal 12. With the above in mind one skilled in the art may, for any given gas, determine the optimum pressure at which the gas in the container should be held. This optimum gas pressure will also be a function of the absorption coefficient of the gas.

One example of a particular etching run conducted with a silicon specimen of N-type conductivity was as follows: A 0.770 gram specimen lost 0.001 gram in one hour where subjected to light from a Hanovia high pressure mercury arc lamp whose range of radiation was from 2100 A. to 9000 A. The specimen was placed in a Pyrex glass container which was 4" in diameter and 3" high. The container had a quartz window at its top through which the light was directed. The specimen was held 2" away from the window. In this run the G gas used was carbon tetrachloride vapor at its saturation pressure, i. e. 50 mm. of mercury.

It should further be added that a B gas (a sensitzer) such as iodine vapor may be added to a G gas as well as to an A gas to hasten the reaction. In one such run iodine vapor at 1 mm. pressure was added to a container filled with carbon tetrachloride gas at its saturation pressure, namely 50 mm. As a result with a sample, as in the above example, 8 mg. were etched in one hour.

There has thus been described a new and novel method of etching semiconductor materials. It is of course apparent that this method may be extended to the photographic and printing arts to produce etched plates and the like.

What is claimed is:

1. A method of etching metals and semiconductor materials comprising the steps of: immersing the body to be etched into an inactive vapor of a photolyzable gas; and directing a beam of ultra-violet light upon said body at the area thereof to be etched.

2. A method of etching metals and semiconductor materials comprising the steps of: placing the body to be etched into a container which is transparent to ultra-violet light; filling said container with a photolyzable gas; and directing a beam of ultra-violet light upon said body at the portion thereof to be etched.

3. A method of etching semiconductor materials comprising the steps of: placing the body to be etched into a container at least a portion of which is transparent to ultra-violet light; filling said container with a photolyzable gas; and directing a beam of ultra-violet light upon said body at the portion thereof to be etched.

4. A method of selectively etching portions of a body of semiconductor material including the steps of: placing the body to be etched into a container at least a portion of which is transparent to light whose wave length is below 3000 A.; filling said container with a photolyzable gas; placing an opaque barrier to said radiation intermediate an ultra-violet light source and said body to be etched, said barrier being of a predetermined shape to permit a predetermined pattern of said light, in conformity therewith, to impinge upon said body; and directing a beam of light whose wave length is below 3000 A. at said body.

5. A method of etching semiconductor materials comprising the steps of: immersing the body to be etched into the inactive vapor of carbon tetrachloride; and directing a beam of light whose wave length is below 3000 A. at said body at the portion thereof to be etched.

6. A method of etching a semiconductor crystal body including the steps of: supporting the body to be etched in an inactive vapor of carbon tetrachloride; and directing a beam of ultra-violet light upon the body to be etched at the area thereof to be etched.

7. A method of etching a crystal body including the steps of: supporting the body to be etched in an inactive vapor of a non-ultra-violet light absorbing gas capable of chemical disassociation into chemically active species, said gas being selected from the group consisting of methyl chloride, carbon tetrachloride, ethylene chloride, ethylene iodide, ethylene bromide and ethylene fluoride; and directing a beam of ultra-violet light upon the body to be etched at the area thereof to be etched.

8. A method of etching a semiconductor speciman including the steps of: supporting the specimen to be etched in an inactive vapor of an A gas and a B gas; and directing a beam of ultra-violet light upon the specimen at the area thereof to be etched wherein A is a gas non-absorbing in the ultra-violet range, and B is a gas which absorbs ultra-violet light to become excited thereby without disassociating.

9. A method of etching a semiconductor specimen including the steps of: supporting the specimen to be etched in inactive vapor of an A gas and a B gas; and directing a beam of ultra-violet light upon the specimen at the area thereof to be etched, wherein A represents a gas selected from the group consisting of hydrogen, oxygen, nitrogen, methane, ethane and ammonia and B is a gas selected from the group consisting of iodine vapor, mercury vapor and xenon.

No references cited.